United States Patent

Kotcharian

[11] 4,060,263
[45] Nov. 29, 1977

[54] CONDUIT FOR CONVEYING A FLUID, THE TEMPERATURE OF WHICH IS DIFFERENT FROM THE SURROUNDING TEMPERATURE

[75] Inventor: Michel Kotcharian, Paris, France

[73] Assignee: Technigaz, Paris, France

[21] Appl. No.: 656,071

[22] Filed: Feb. 6, 1976

[30] Foreign Application Priority Data

Feb. 24, 1975 France .................................. 75.05679

[51] Int. Cl.² .......................... F16L 9/22; F16L 59/16
[52] U.S. Cl. ......................................... 285/47; 138/28;
138/149; 138/155; 285/133 R; 285/226;
285/DIG. 5
[58] Field of Search ...................... 138/28, 30, 32, 113,
138/114, 120, 121, 148, 149, 153, 155, 177;
285/47, 53, 223, 226, 133 R, 187, 302, DIG. 5

[56] References Cited

U.S. PATENT DOCUMENTS 3,878,868 4/1975 Wheeler ................................. 138/32
3,901,539 8/1975 Ijzerman ........................... 138/120 X

*Primary Examiner*—Richard E. Aegerter
*Assistant Examiner*—Frederick R. Schmidt
*Attorney, Agent, or Firm*—Steinberg & Blake

[57] ABSTRACT

A conduit for conveyance of a fluid and especially liquefied natural gas and comprising an internal circulation pipe for said fluid surrounded with a sheath of insulating material protected by an outer rigid covering, said sheath comprising several fluid-tight lap joints of coaxial structure and variable lap surface and said circulation pipe being interrupted at joint emplacements thus communicating with corresponding fluid-tight annular cylindrical spaces defined between a respective stationary coaxial sleeve surrounding a gap of said circulation pipe and two corrugate or waved compensators respectively connected between one sleeve end and the external surface of said circulation pipe at either side of said gap.

20 Claims, 6 Drawing Figures

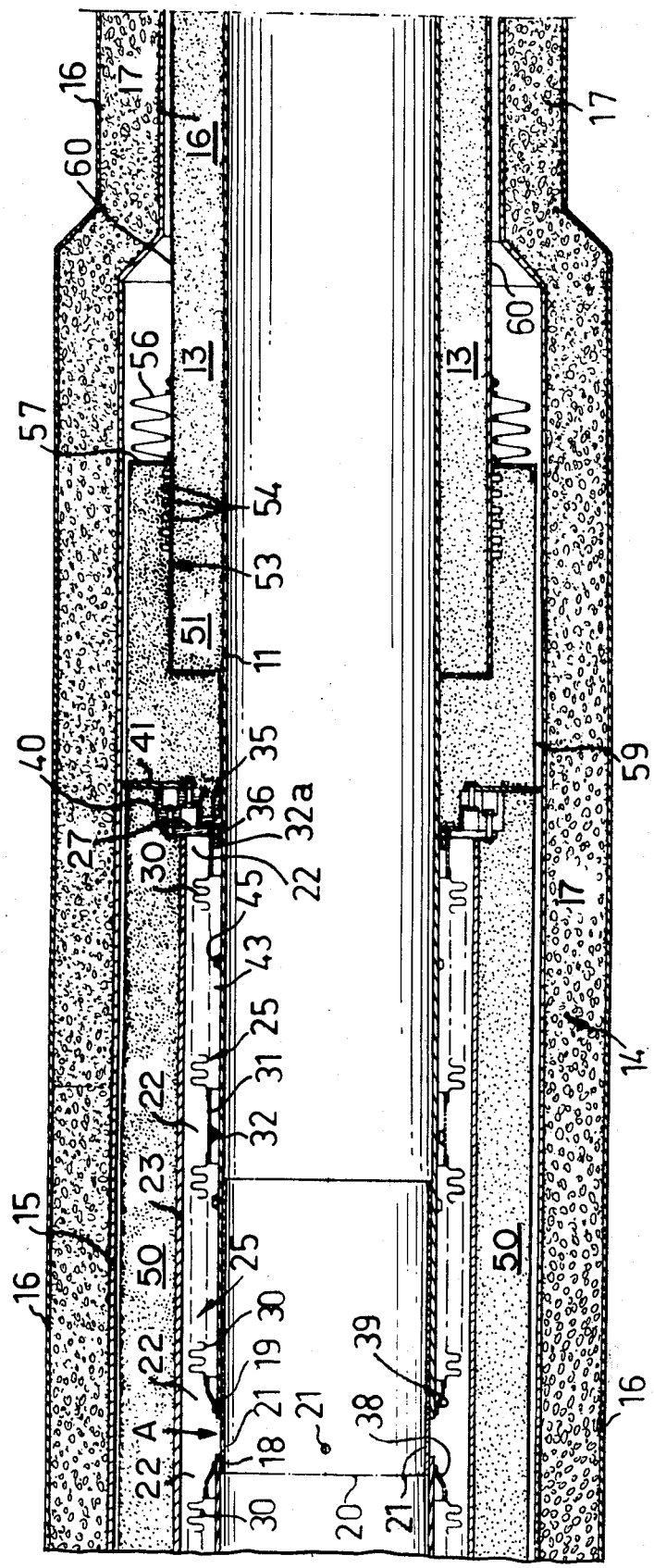

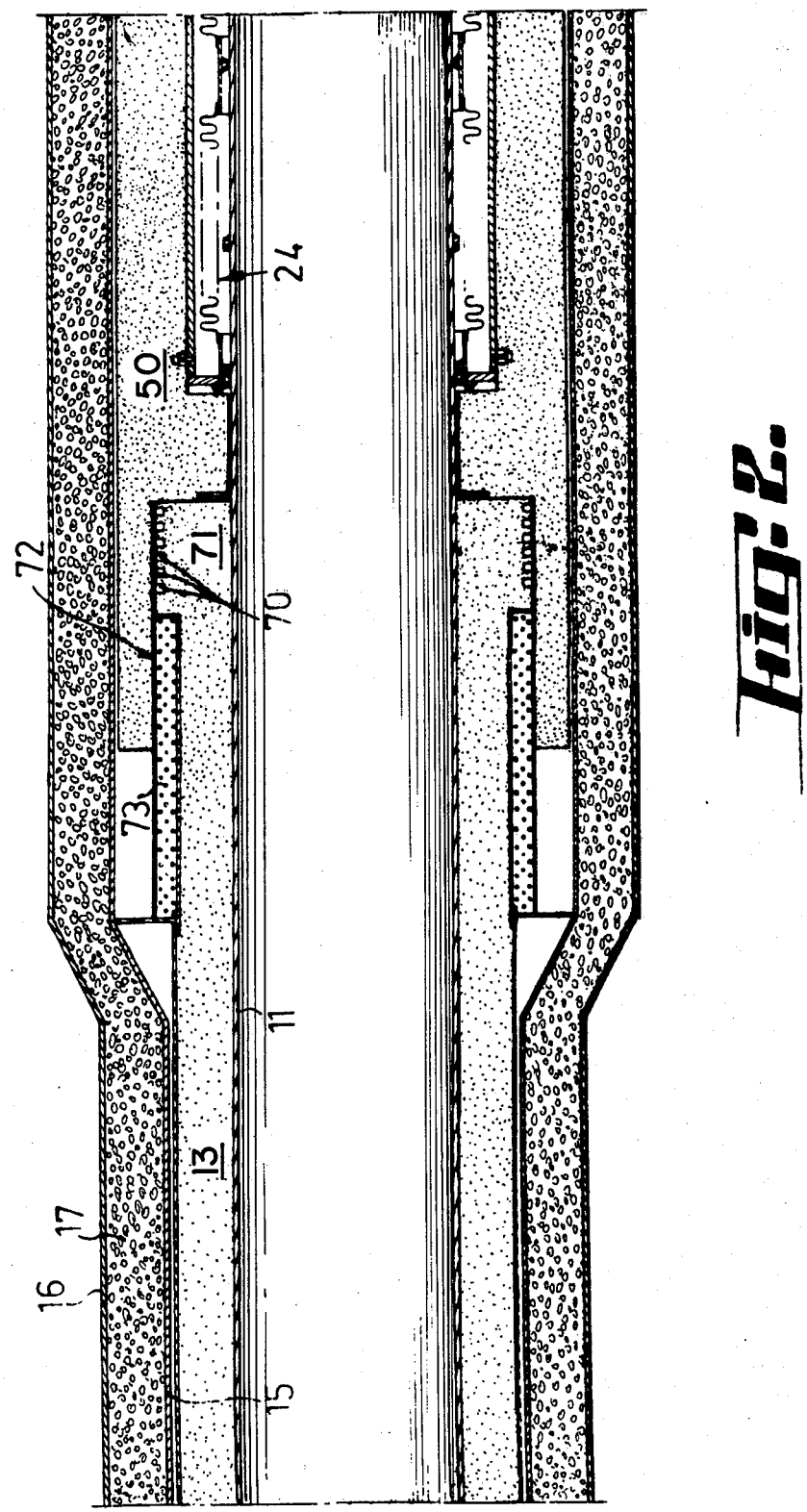

CONDUIT FOR CONVEYING A FLUID, THE TEMPERATURE OF WHICH IS DIFFERENT FROM THE SURROUNDING TEMPERATURE

The present invention relates essentially to the conveyance of a fluid, the temperature of which is substantially different from the surrounding or ambient temperature. The invention has more particularly for its object a new type of conduit for conveyance of the said fluid, remarkable for the structure of both its heat insulation and its outer protecting convering and that of the devices allowing the expansions (in the case of a hot fluid or the contractions (if it is a cold fluid) of the conduit elements in thermal contact with the said fluid to be compensated for.

The invention has been more specifically developed to solve the problems involved in the conveyance, in particular the underwater conveyance, of liquefied natural gas, for the purpose of establishing, for example, a connection between on-shore plants and an advanced off-shore loading location, or of conveyance across a lake or a river.

The conveyance or liquefied natural gas presents a certain number of problems. In addition to the above-mentioned thermal deformations which have to be compensated for without producing stresses which may cause conduit breakage, mention should be made, in particular, of the problem of thermal bridges, which it is not always easy to eliminate for technological reasons and which, should they exist, are likely to substantially reduce the aggregate efficiency of the heat insulation.

Moreover, in the case of underwater conveyance of liquefied natural gas, mention may be made of a certain number of additional problems, among which:

the necessity of ballasting the conduit, for example by means of a concrete wrapping;

The resistance of the conduit to water pressure;

the required perfect fluid-tightness of the protecting covering, so as to prevent water from impregnating the structure of the insulation and turning into ice owing to the cold furnished by the liquefied natural gas, which would cause the destruction of the insulation, due to the expansion of formation of ice crystals.

All these problems have hitherto been solved only partially and often at the cost of highly complicated and very expensive conduit structures. For example, in order to compensate for the thermal contractions of the inner pipe for conveyance of the liquefied natural gas, an attempt was made to intercalate therein, at regular intervals, some kinds of bellows. But the latter worked under very bad conditions, since the pressure of the fluid being conveyed had a tendency to burst the said bellows whereas the axial contractions of the inner pipe simultaneously tended to stretch the same.

One of the advantageous aspects of the present invention is precisely that the bellows or corrugate or waved compensators work in external transverse pressure and in axial compression.

Moreover, another advantage of the invention lies in the particular structure (especially in the continuity) of its insulation, which is not disturbed by any thermal bridge between the inner pipe and the outer protecting covering, whatever the amplitude of the thermal deformations.

The invention therefore relates more specifically to a conduit for conveyance of a fluid, in particular a fluid whose temperature is substantially different from the surrounding or ambient temperature, including a circulation pipe for the said fluid surrounded with a sheath of insulating material protected by an outer rigid covering, characterized in that the said sheath of insulating material is interrupted at substantially regular intervals and so conformed or shaped as to constitute at least one fluid-tight lap joint having a coaxial structure and a variable lap surface, that the said circulation pipe is interrupted at substantially regular intervals thus defining gaps, each of said gaps thus defining two ends opposite one another in said circulation pipe, and that it communicates, through the medium of each said gap, with a corresponding fluid-tight, substantially annular cylindrical space outside the said pipe, defined by a stationary coaxial sleeve extending at either side of the said gap over a certain length and by two corrugate or waved compensators connected respectively between each end of the said sleeve and one of said two ends opposite one another.

According to another aspect of the invention, and more particularly for underwater conveyance, the aforesaid rigid covering has a composite structure including at least one fluidtight continuous barrier, for example of steel, and a concrete ballasting covering allowing the immersion of the said conduit.

The invention will be better understood and other purposes and advantages of the latter will appear more clearly from the following explanatory description given solely by way of example with reference to the appended non limitative drawings wherein:

FIGS. 1A and 1B together form a longitudinal sectional view of a portion of a conduit according to one embodiment of the invention, showing in particular the technical solutions used to compensate for the thermal deformations of the circulation pipe and the sheath of insulating material, the illustrated structure recurring at substantially regular intervals along the said conduit;

FIG. 2 is a detailed view of the same conduit showing a modification of a fluid-tight lap joint;

Figure 1A:
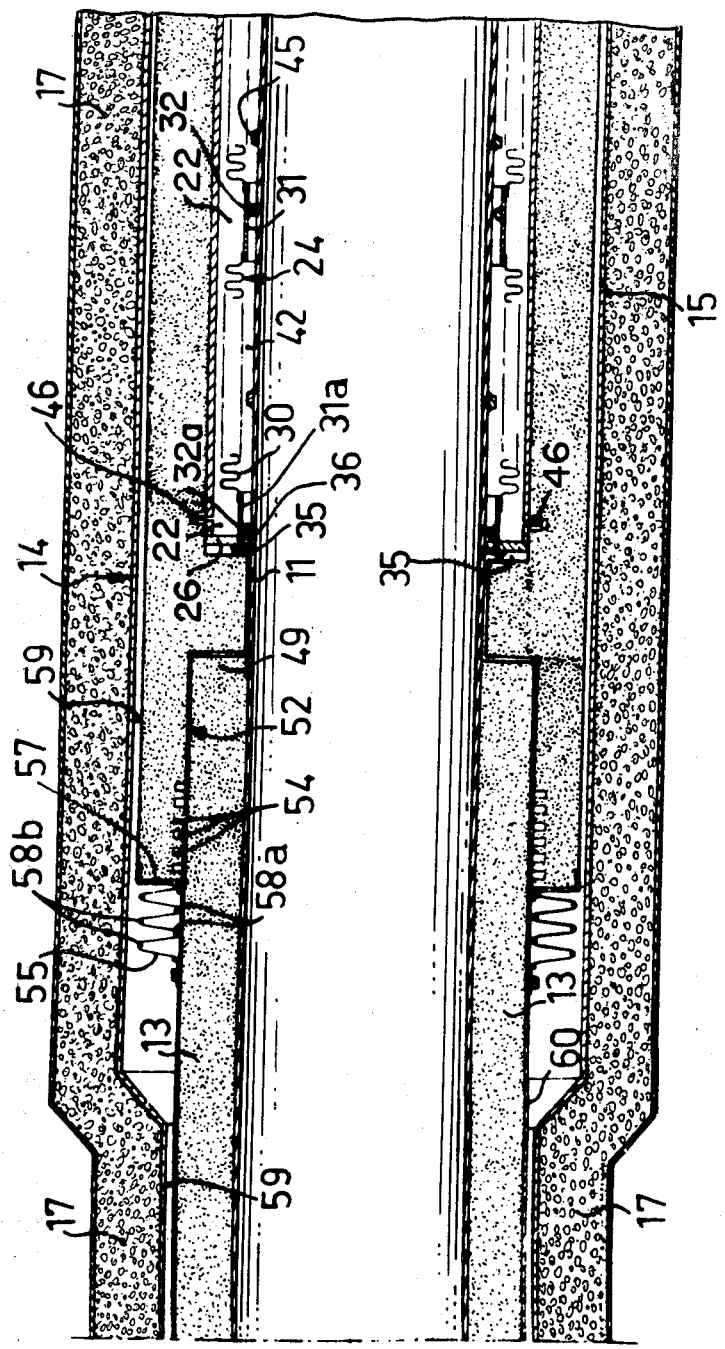

Referring more particularly to FIGS. 1A and 1B there is shown a sectional view of a portion of a conduit for underwater conveyance of liquefied natural gas. The said conduit is made up mainly of a circulation pipe 11 for the fluid, a sheath means 13 of insulating material directly applied on the pipe 11 and an outer rigid covering having a composite structure and designated as a whole by reference numeral 14. The circulation pipe 11 is made from an appropriate material retaining its low-temperature ductility, for example nickel steel. The sheath 13 of insulating material may be made from any material offering suitable heat insulation and mechanical strength qualities. By way of example, use can be made of injected foam polyurethane. The composite covering 14 is essentially constituted by two thin tubular barriers 15 and 16 surrounding a continuous lean-concrete covering 17. The two tubular barriers are for example of steel and form a fluid-tight protection for the other, innermost elements of the conduit. An anti-corrosive coating covers the outer surface of the barrier 16. FIGS. 1A and 1B show a quite particular, widened portion of the conduit, containing the whole set of devices allowing the contractions in the pipe 11 and the sheath 13 to be compensated for. The drawing shows the position of the various members at the ambient temperature, i.e. without cooling contraction. To this end, the pipe 11 is interrupted at A, thus defining two ends 18 and 19 opposite one another and separated by a variable distance depending upon the extent of the contractions. An internal lap sleeve 20 is secured, for example welded, to the end 18 and can slide with respect to the other portion of pipe 11, beyond the end 19. This internal sleeve eliminates any turbulence of a circulating liquefied natural gas, which may be caused by the interruption of the pipe. The sleeve 20 is provided with several uniformly spaced holes 21 (FIG. 1B) opening into a fluid-tight, substantially annular cylindrical space 22 defined by a stationary coaxial sleeve 23 slightly larger in diameter than the pipe 11, by two corrugate or waved compensators 24 and 25 and by two crown- or ring-shaped plates 26, 27 obturating the ends of the sleeve 23 and forming part of a fixing means for fixing the compensators 24 and 25 to the stationary sleeve 23. The uniform arrangement of the holes 21 allows a good balancing of the fluid pressure within the whole space 22. Each compensator 24, 25 is constituted by several resilient corrugate cylindrical portions 30 connected with one another by cylindrical rings 31 adapted to slide on the outer surface of the pipe 11 through the medium of a internal annular rib 32. The remotest ends of the compensators 24, 25 with respect to the gap at A are sealingly welded to the corresponding plates 26, 27 through the medium of rings 31a of the same nature as but shorter than the rings 31 and forming with the plates 26, 27 the fixing means for fixing the compensators 24, 25 to the stationary sleeve 23. At each end of the sleeve 23, the rib 32a of the corresponding ring 31a co-operates with a flat washer 35 secured to any one of the plates 26, 27 in order to form with each of the said plates an accommodating recess for a sliding O-ring 36. In this manner, the crown-shaped plates 26, 27 are applied on the outer surface of the pipe 11 through the medium of the O-rings 36. The other end of the compensator 24 is welded on the end 18 through the medium of a cylindrical, slightly tapering member 38. The other end of the compensator 25 is itself welded on the end 19 through the medium of a cylindrical, slightly tapering member 39. It will be noted that, according to the foregoing description, all the elements materializing the substantially annular cylindrical space 22 are assembled by welding without any seal being in direct contact with the liquefied natural gas. This ensures perfect fluid-tightness with respect to the adjacent insulating material.

The plate 27 is secured to a heat insulating block 40 which is annular in shape and itself mounted, through the medium of fastening means distinct from those of plate 27, on an internal flat ring 41 welded to the barrier 15. Thus the block 40 and ring 41 form through the plate 27 an attaching means for attaching the sleeve 23 to the outer rigid covering 14 so as to be stationary with respect thereto, and thus in this way the sleeve 23 is maintained stationary. The spaces 42, 43 defined, on the one hand, by the compensators 24, 25 and on the other hand by the pipe 11 are filled with a neutral gas. It should be noted that in the said spaces are provided stops 45 adapted to co-operate with the ribs 32 with a view to limiting the axial compression of each flexible portion 30 to a predetermined maximum value. Several drain orifices 46 opening into the space 22 are provided for hydraulic tests.

As appears clearly from FIG. 1, the sheath means 13 of insulating material is interrupted and terminates in end portions 49, 51 at either side of the sleeve 23 and the sheath means includes an auxiliary sleeve 50 of insulating material, for example of the same nature as the remainder of the sheath means 13, covering the whole of the sleeve 23 and a certain portion of the end portions 49 and 51 of the sheath 13, so as to form with each of the latter a fluid-tight lap joint 52–53, respectively, having a coaxial structure and a variable lap surface. The inner surface of the sleeve 50 is provided with labyrinth joint slots 54 located in the regions of the lap joints 52 and 53. Furthermore, fluid-tightness is increased by the presence of bellows 55, 56 having a coaxial structure, respectively stuck or welded between each end of the sleeve 50 (through the medium of reinforcing plates 57) and the outer surface of the sheath 13. The said bellows are made of a flexible, slightly resilient material, such as, for example, polyethylene, stretched between two series of hoops 58a, 58b.

Lastly, it will be noted that the outer diameter of the sheath 13 is substantially smaller than the inner diameter of the composite rigid covering 14 in order to provide a sweeping or scavenging space 59 in which a neutral gas may be made to circulate. The same remark applies to the diameter of the sleeve 50 with respect to the diameter of the enlarged portion of the covering 14 in order not to obturate the said sweeping space. Moreover, the sheath 13 is covered with a gas-tight coating 60, for example of polyethylene, facilitating its sliding along the inner surface of the barrier 15.

The behaviour of the conduit just described, when liquefied natural gas is introduced therein, is quite simple and can be inferred directly from the foregoing description.

Under the action of cold, the pipe 11 and the sheath 13 contract and the whole assembly slides along the inner surface of the barrier 15. As regards the pipe 11, the entire contraction is reflected in the gap A and results in a displacement of the ends 18 and 19 from one another. This contraction, therefore, causes no tensile stress in the pipe 11, since the deformation is compensated for by a contraction of the corrugate compensators 24 and 25.

As for the sheath 13, the contraction is reflected at the lap joints 52 and 53 and results in an increase in the distance between the ends 49 and 51. It will be noted that the continuity of the insulation is in no way affected by this contraction. The neutral gas circulating within the sweeping space 59 ensures the elimination of both the natural gas traces having managed to pass through the insulation and the moisture traces proceeding from the outside in spite of the barriers 15 and 16.

According to a quite advantageous feature of the invention, it may be pointed out that the compensators 24 and 25 work in external transverse compression under the action of the pressure of the liquefied natural gas and in longitudianl compression under the action of the shrinkage of the pipe 11. Thus, under the action of a strong pressure of the liquefied natural gas, the corrugate portions 30 will be in the worst case crushed along the outer surface of the pipe 11 but no bursting is to be feared. Likewise, longitudinal compression is advantageous for the reason that the ultimate tensile strength of the compensators will thus never be reached.

It will be noted, moreover, that in the embodiment illustrated in FIGS. 1A and 1B the pressure exerted by the water on the immersed conduit is supported by the concrete 17 and not by the barriers 15 or 16. Indeed, all the fluid-tight barriers 16 does is to transmit to the concrete the pressure or compressive stresses.

Also worthwhile mentioning is a particular advantage resulting from the drain orifices 46 (FIG. 1A) opening into the space 22. Indeed, hydraulic tests for controlling the strength and fluidtightness of the welds were carried out at the factory. Other defects, which were undetectable by that method, could therefore occur subsequently during transportation or installation. The provision of orifices 46 now enables the same control operations to be carried out when the conduit is completely laid, just before it is set to work.

FIG. 2 shows a modification of FIGS. 1A and 1B which differs therefrom only by the structure of the fluid-tight lap joints between the sleeve 50 and the sheath 13. In this modification, labyrinth joint slots 70 are provided on the end 71 of the sheath 13 and a portion of the lap region of the said fluid-tight lap joint 72 is provided with an impervious compressible intermediate joint 72 replacing the corresponding bellows shown in FIGS. 1A and 1B. The joint 73 is for example constituted by a synthetic material such as preferably closed-cell expanded polyvinyl chloride. Of course the behaviour of a conduit according to the modification illustrated in FIG. 2 in exactly identical with that of a conduit according to the embodiment of FIGS. 1A and 1B.

Figure 3:
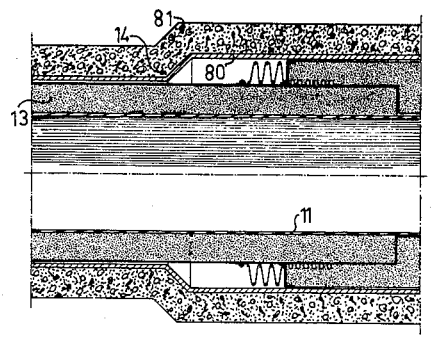
FIG. 3 is a modification of the outer rigid covering associated with the embodiment of the lap joint shown in FIG. 1.

FIG. 3 shows another modification concerning more particularly the structure of the outer rigid covering 14. In this modification, the thin barriers 15 or 16 are done away with and replaced by a thick barrier 80 surrounded with a reinforced-concrete covering 81. Since the outer surface of the concrete covering 81 is not protected by a fluid-tight barrier, the concrete which is porous is no longer subjected to the pressure of the water, which is entirely transmitted to the barrier 80. This is the reason why the barrier 80 must be much stronger since it alone supports all the transverse stresses tending to crush the immersed conduit. Moreover, in this modification, it is not necessary that the ballasting concrete covering be continuous. Indeed, it may suffice to cast concrete blocks about the barrier 80 at regular intervals along the immersed conduit. In this case, it may be useful to apply an anti-corrosive coating on the outer surface of the barrier 80.

Figure 4:
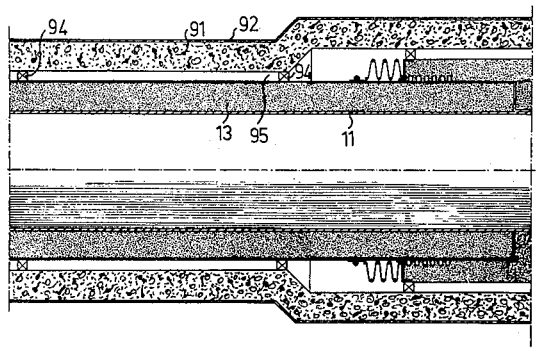
FIG. 4 is another modification of the outer rigid covering.

FIG. 4 shows another modification, in which the reinforced-concrete covering 91 may actually withstand transverse pressure or compressive stresses, since the concrete is made impervious at its outer surface by the presence of a thin metal fluid-tight barriers 92. Furthermore, in this modification, the inner barrier is done away with and the sheath 13 of insulating material can slide with respect to the concrete covering 91 through the medium of wooden spacer shoes 94. Thus, in this modification, there is automatically formed a sweeping or scavenging space 95 radially wider than in the previously described forms of embodiment.

Figure 5:
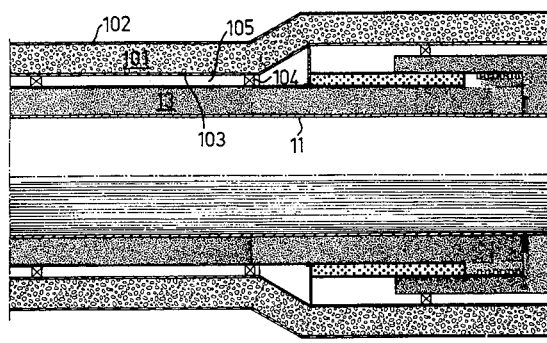
FIG. 5 shows another modification of the outer rigid covering associated with the embodiment of the lap joint represented in FIG. 2.

FIG. 5 illustrates another possibility where a lean concrete covering 101 has been case between two thin fluid-tight barriers, i.e. an outer barrier 102 and an inner barrier 103. As previously, spacer shoes 104 allow the sheath 13 of insulating material to slide along the barrier 103 while at the same time materializing a wide sweeping or scavenging space 105.

It should be noted that any combinations are also possible between the modifications illustrated in FIGS. 3, 4 and 5 and the embodiments of FIGS. 1A, and 1B 2.

Of course, the invention is by no means limited to the embodiments just described, which have been given by way of example only. Thus, in all the above-described embodimnts, the structure provided is substantially symmetrical with respect to the gap A, since two expansion joints for the insulating sheath 13 are arranged at either side of the sleeve 23 covering the contraction compensators 24 and 25 for the pipe 11. However, it is perfectly possible to use a non-symmetrical structure including a single expansion joint for the sheath 13, arranged at only one side of the sleeve 23. The lap surface of this single joint will simply have to be doubled in length. Likewise, although there has been described a conduit for the conveyance of cold fluids, the same principles are applicable to the conveyance of hot fluids. The few modifications to be provided in the latter case relate to the initial distance (i.e. at the ambient temperature) between the ends 18–19, which will have to be maximum, and the initial lap surfaces of the joints 52–53 which will have to be minimum. The invention therefore comprises all technical equivalents to the means described, should the latter be carried out within the scope of the following claims.

What is claimed is:

1. Conduit for conveyance of a fluid, in particular a fluid whose temperature is substantially different from the surrounding or ambient temperature, including a circulation pipe for the said fluid, sheath means of insulating material surrounding and engaging said pipe and an outer rigid covering surrounding and protecting said sheath means, characterized in that the said sheath means of insulating material is interrupted at substantially regular intervals and said sheath means forming at each interval at least one fluid-tight lap joint having a coaxial structure and a variable lap surface, that the said circulation pipe is interrupted and terminates at the region of each interval in two spaced ends defining between themselves a gap in said circulation pipe, and that said pipe communicates, through the medium of said gap, with a fluid-tight, substantially annular cylindrical space outside the said pipe, a stationary coaxial sleeve surrounding and spaced from said pipe and surrounded by said lap joint of said sheath means, said sleeve extending across and beyond said gap over a certain length and two corrugated waved compensators, a pair of connecting members respectively fixedly connecting said compensators to said pipe at the region of said two ends thereof, fixing means fixing said compensators at portions thereof respectively distant from said pipe ends to said stationary sleeve, said sleeve and compensators defining between themselves said substantially annular cylindrical space with which said pipe communicates through said gap thereof, and attaching means attaching said sleeve to said outer rigid covering for maintaining said sleeve stationary.

2. Conduit for conveyance of a fluid according to claim 1, characterized in that the said sheath means has end portions at either side of the said stationary sleeve and that said sheath mean includes an auxiliary sleeve of insulating material covering the whole of the said stationary sleeve as well as said end portions of the said sheath means to form with each of the said end portions of said sheath means said fluid-tight lap joint.

3. Conduit for conveyance of a fluid according to claim 2, characterized in that a coaxial bellows has end regions which are sealingly stuck, adhesively bonded or welded between an end of said auxiliary sleeve and an adjacent outer surface of said sheath means beyond said auxiliary sleeve.

4. Conduit for conveyance of a fluid according to claim 2, characterized in that a coaxial bellows has end regions which are sealingly stuck, adhesively bonded or welded between one end of the aforesaid auxiliary sleeve and the adjacent outer surface of the aforesaid sheath means of insulating material.

5. Conduit for conveyance of a fluid according to claim 1, characterized in that at least a portion of the lap region of the said fluid-tight lap joint is provided with an intermediate impervious compressible joint constituted for example by a synthetic material such as preferably closed-cell expanded polyvinyl chloride.

6. Conduit for conveyance of a fluid according to claim 1, characterized in that one of the variable lap surfaces of the said fluid-tight lap joint of coaxial structure is provided with labyrinth joint slots.

7. Conduit for conveyance of a fluid according to claim 1, characterized in that an inner covering or lap sleeve is secured to one portion of said pipe at the region of one of the pipe ends and extends across said gap and slidably engages another portion of the said pipe which terminates in the other of said pipe ends and said lap sleeve being formed with several regularly spaced pressure balancing holes communicating with or opening into the aforesaid substantially annular cylindrical space.

8. Conduit for conveyance of a fluid according to claim 7, characterized in that both ends of the said stationary sleeve are obturated around the said circulation pipe by two respective crown- or ring-shaped plates, that each corrugate or waved compensator is sealingly connected to the corresponding plate and that the said crown- or ring-shaped plates are applied on the outer surface of the said circulation pipe through the medium of respective sliding O-rings, said plates forming at least part of said fixing means for fixing said compensators to said stationary sleeve.

9. Conduit for conveyance of a fluid according to claim 8 characterized in that a heat insulating block forming at least part of said attaching means secures one of the said crown- or ring-shaped plates to the aforesaid outer rigid covering.

10. Conduit for conveyance of a fluid according to claim 1, characterized in that each aforesaid corrugated waved compensator is constituted by several flexible corrugate, waved or undulated cylindrical portions connected with one another by cylindrical rings adapted to slide on the outer surface of the said circulation pipe between stops secured on the said outer surface.

11. Conduit for conveyance of a fluid according to claim 1, characterized in that the spaces defined by the compensators and the outer surface of the said circulation pipe are filled with neutral gas.

12. Conduit for conveyance of a fluid according to claim 1, characterized in that said stationary sleeve is formed with at least one drain orifice for hydraulic tests opening into the aforesaid substantially annular cylindrical space.

13. Conduit for conveyance of a fluid according to claim 1, characterized in that a gas-tight coating of, for example, polyethylene, covers the outer surface of said sheath means for facilitating sliding thereof along the inner surface of the aforesaid rigid covering.

14. Conduit for conveyance of a fluid according to claim 1, intended more particularly for conveyance of liquefied natural gas, characterized in that the outer diameter of the aforesaid sheath means of insulating material is substantially smaller than the corresponding inner diameter of the aforesaid rigid covering, in order to provide a sweeping or scavenging space between the said sheath means and the said covering in which a neutral gas can be made circulate.

15. Conduit for conveyance of a fluid according to claim 14, characterized in that spacer shoes made from insulating material such as, for example, wood are situated between said sheath means and rigid covering, the said sheath means bearing upon or being supported by the said inner surface of the said covering through the medium of said spacer shoes.

16. Conduit for conveyance of a fluid according to claim 1, characterized in that the aforesaid rigid covering has a composite structure comprising at least one fluid-tight continuous barrier, for example of steel, and one ballasting concrete covering permitting the immersion of the said conduit.

17. Conduit for conveyance of a fluid according to claim 16, characterized in that the said barrier is an internal barrier adapted to withstand a predetermined maximum transverse pressure and that the said ballasting concrete covering is made of reinforced concrete and is not necessarily continuous.

18. Conduit for conveyance of a fluid according to claim 16, characterized in that said rigid covering comprises inner and outer thin barriers between which a continuous covering of lean concrete is situated, at least the outer barrier being fluid-tight.

19. Conduit for conveyance of a fluid according to claim 16, characterized in that the aforesaid rigid covering has a composite structure comprising at least one fluid-tight continuous external thin barrier, for example of steel, surrounding a continuous ballasting covering of reinforced concrete permitting the immersion of the said conduit.

20. Conduit for conveyance of a fluid according to claim 16, characterized by an anti-corrosive coating covering at least part of the fluid-tight barrier.

* * * * *